United States Patent Office 2,919,930
Patented Jan. 5, 1960

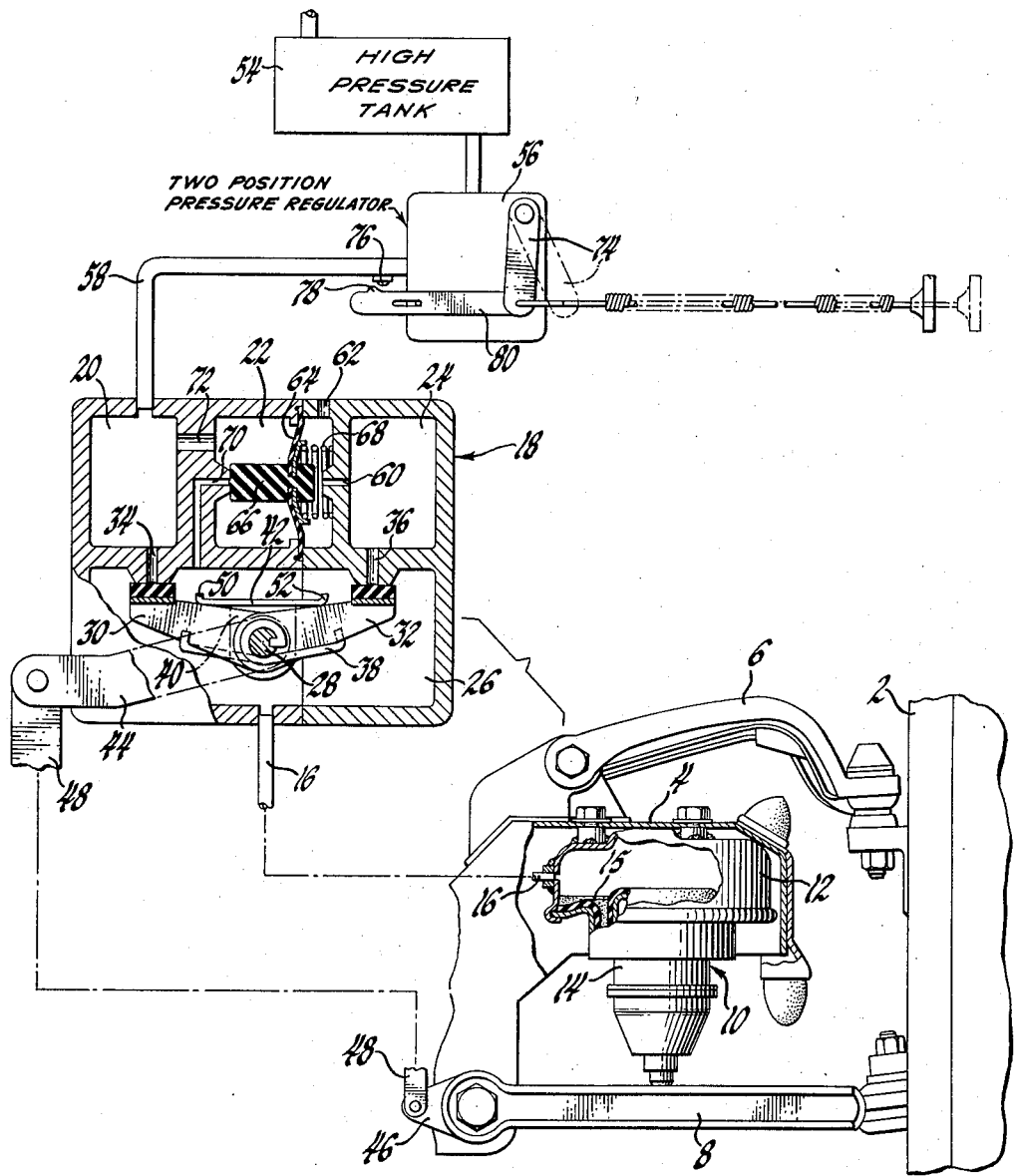

2,919,930

HEIGHT EXTENDING CONTROL APPARATUS FOR AIR SUSPENSION

Casimer J. Cislo, Detroit, Mich., assignor to General Motors Corporation, Detroit, Mich., a corporation of Delaware Application July 28, 1958, Serial No. 751,276

12 Claims. (Cl. 280—124)

This invention relates to pneumatic suspension for vehicles and more particularly to control apparatus therefor.

An object of the present invention is to provide an improved pneumatic suspension system for vehicles.

Another object is to provide a pneumatic suspension system of the type including leveling valves operative to maintain the sprung mass of the vehicle at a normal predetermined vertical trim height and including further control means adapted to overrule the normal operation of the leveling valves and cause lifting of the sprung mass to an extended trim height.

A further object is to provide an arrangement of the stated character capable of adjustment so that the extended trim height falls at any desired level between the normal trim height and the maximum rebound position of the suspension.

Yet a further object is to provide lift control apparatus for pneumatic vehicle suspension which operates to lift the sprung portion of the vehicle to the extended position by a predetermined increase in pressure in the regulated high pressure circuit for the suspension.

Still a further object is to provide a lift control device for use in conjunction with an air suspension system employing an open type fluid supply circuit wherein air exhausted from the vehicle air springs is discharged to atmosphere directly from the leveling valves associated with the spring.

These and other objects, advantages and features of the invention will become more fully apparent as reference is had to the accompanying specification and drawing wherein:

In the drawing, there is shown an elevational view of a leveling valve assembly according to the invention together with related portions of an air suspension fluid circuit and the mechanical structure of an air spring assembly controlled by the leveling valve assembly.

The reference character 2 designates a vehicle wheel which is mounted for oscillatory movement with respect to a vehicle frame 4 by means of a pair of laterally extending vertically spaced upper and lower control arms 6 and 8, respectively. Frame 4 is resiliently suspended with respect to wheel 2 by means of an air spring assembly 10 interposed between frame 4 and an intermediate portion of lower control arm 8. It will be understood that the remaining three wheels of the vehicle, not shown, are connected to a vehicle in a similar or other suitable manner and are likewise provided with pneumatic springs similar to 10 which elastically support the remaining portion of the sprung mass of the vehicle, not shown.

Spring 10 comprises a dome-like rigid air confining cylinder 12, piston member 14, and a flexible diaphragm element 15 disposed between piston 14 and cylinder 12. The sprung mass of the vehicle is normally supported at a predetermined level relative to the ground by air under pressure introduced into dome 12 via conduit 16.

To control entrance and exit of air through conduit 16, there is provided a leveling valve assembly 18 which in the illustrated embodiment takes the form of a casing having three separated upper compartments 20, 22 and 24, and an elongated lower compartment 26. Pivotally mounted in compartment 26 on a shaft 28 are a pair of swingable closure members 30 and 32. A torsion spring 38 biases closures 30 and 32 clockwise and counterclockwise, respectively, into engagement with an intake orifice 34 opening into compartment 20 and exhaust orifice 36 opening into compartment 24. Mounted coaxially with closures 30 and 32 on a shaft 28 is a closure actuator 40 having a ledge portion 42 overlying the upper edges of closures 30 and 32. Actuator 40 is adapted for rotation responsive to swinging movement of a lever 44 which is disposed externally of valve assembly 18 and is connected to a projecting arm 46 on suspension lower arm 8 by means of a drop link 48.

In operation, descending movement of frame 4 imparts downward movement to arm 46 and link 48, causing counterclockwise rotation of lever 44 and actuator 40. Upon movement of actuator 40, the end 50 of ledge 42 engages the upper edge of closure 30 and urges the latter downwardly against the resistance of spring 38 thereby opening orifice 34 and placing compartment 20 in communication with conduit 16. Rising movement of frame 4 causes a reversal of the described mechanical operation which causes the end 52 of ledge 42 to displace closure 32 thereby opening exhaust orifice 36 and placing compartment 24 in communication with conduit 16. It will therefore be seen that opening of closure 30 permits high pressure air to flow from supply tank 54 to a two-position pressure regulator 56, through conduit 58 into compartment 20 and thence to spring 12, while opening of closure 32 permits air in spring 12 to flow through conduit 16 into exhaust cavity 24 from which it flows through an orifice 60 into cavity 22 and thence directly to atmosphere through a port 62.

In order to provide a temporary extended trim height or lift portion of the sprung portion of the vehicle in accordance with the present invention, compartment 22 has disposed therein a partition formed by a flexible diaphragm 64. Secured to diaphragm 64 is a laterally movable resilient closure member 66. Closure member 66 is normally biased leftwardly by a coil spring 68 into seating engagement with the mouth of passage 70 providing communication between compartment 22 and lower compartment 26. A second passage 72 extends between compartment 20 and compartment 22 to provide constant communication therebetween.

Under normal conditions of operation, the pressure in high pressure conduit 58 is the lower of two regulated pressures provided by two-position pressure regulator 56, previously referred to, which, for example, is adjusted to provide 145 p.s.i. when the control lever 74 is in the position shown in solid lines and 170 p.s.i. when in the position shown in dotted lines. In any case, however, the lower pressure exerted on diaphragm 64 is less than the resisting force of spring 68, for which reason closure 66 remains in the position shown during normal operation. However, upon movement of the pressure regulator control 74 to the position shown in dotted lines, the normal regulated pressure in line 56 is increased by the predetermined amount which is sufficient to overcome the resistance of spring 68 whereupon closure 66 is displaced to the right opening passage 70 and allowing communication between compartments 22 and 26. Thereafter, high pressure air is permitted to flow from conduit 58 to compartment 20 through passage 72 into cavity 22, through by-pass passage 70 into compartment 26 and ultimately to spring 12 through conduit 16 even though intake valve closure 30 remains in the closed position. Spring 12 will, therefore, be inflated until the gauge pressure therein corresponds with the gauge pressure in high pressure conduit 58.

It is to be noted that during the course of inflation of spring 12 through bypass passage 70, the linkage mechanism controlling the position of closures 30 and 32 will displace closure 32 opening exhaust orifice 36. However, even though exhaust orifice 36 provides open communication between spring 12 and compartment 24, exhausting of air from the latter to atmosphere is prevented due to the fact that displacement of closure 66 to the right to uncover bypass passage 70 simultaneously closes exhaust passage 60. Therefore, as long as pressure regulator control 74 remains in the position shown in dotted lines providing increased regulated pressure in conduit 56, no air may exhaust from spring 12. However, upon return movement of control 74 to the position shown in solid lines, the high regulated pressure in conduit 58 is returned to the normal lower pressure, whereupon spring 68 overcomes the reduced pressure in compartment 22 and returns closure 66 to the normal position closing bypass passage 70 and opening exhaust passage 60. To accomplish rapid reduction of pressure in conduit 58, the latter incorporates a ball type relief valve 76, which is adapted for momentary wiping engagement by a lobe 78 formed on a link 80 which moves with control 74. Immediately upon opening of passage 60, air contained in spring 12 proceeds to exhaust to atmosphere through port 62 until closure 32 is permitted to return to the position closing orifice 36, at which time the sprung mass resumes the normal trim height. Thereafter, leveling of the vehicle sprung mass is again accomplished by opening and closing movement of closures 30 and 32, as previously described.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In an air suspension system of the type including a high pressure circuit having an adjustable pressure regulator therein, an air spring, a leveling valve assembly for controlling the volume of air confined in said spring, said assembly comprising a casing having intake and exhaust passages, said intake passage communicating with said high pressure circuit, mechanically actuated closures for said passages, and means responsive to increased pressure in said high pressure circuit above a predetermined level providing an alternate air intake path to said spring.

2. In a vehicle air suspension system of the type including a high pressure circuit having an adjustable pressure regulator therein, an air spring, a leveling valve assembly for controlling the volume of air confined in said spring, said assembly comprising a casing having intake and exhaust passages, said intake passage communicating with said high pressure circuit, closures for said passages mechanically actuated responsive to variation in vehicle trim height, and means responsive to increased pressure in said high pressure circuit above a predetermined level simultaneously providing an alternate air intake path to said spring and blocking said exhaust passage.

3. In an air suspension system of the type including a high pressure circuit having an adjustable pressure regulator therein, an air spring, a leveling valve assembly for controlling the volume of air confined in said spring, said assembly comprising a housing having an intake and an exhaust passage, said intake passage communicating with said high pressure circuit, mechanically actuated closures normally biased to positions closing said passages, a second intake passage, and a pressure responsive element normally closing said second passage, said element being movable responsive to predetermined increase of pressure in said high pressure circuit to simultaneously open said second intake passage and close said exhaust passage.

4. In an air suspension system of the type including a high pressure circuit having an adjustable pressure regulator therein, an air spring, a leveling valve assembly for controlling the volume of air confined in said spring, said assembly comprising a housing having an intake and an exhaust passage, said intake passage communicating with said high pressure circuit, mechanically actuated closures normally biased to positions closing said passages, a second intake passage, and a spring biased pressure responsive element normally closing said second passage, said element being movable against said spring responsive to predetermined increase of pressure in said high pressure circuit to simultaneously open said second intake passage and close said exhaust passage.

5. In a vehicle air suspension system of the type including a high pressure circuit having an adjustable regulator therein, an air spring disposed between the sprung and unsprung mass of the vehicle, a leveling valve assembly for controlling the volume of air confined in said spring, said assembly comprising a casing having an intake and an exhaust passage, said intake passage communicating with said high pressure circuit, coaxially mounted oppositely biased closures normally closing said passages, closure operating means movable responsive to variation in displacement between the sprung and unsprung mass of the vehicle, a second intake passage, a spring biased element normally closing said second passage, fluid pressure responsive means associated with said element effective to move the latter responsive to predetermined increase of pressure in said high pressure circuit to a position simultaneously opening said second intake passage and closing said exhaust passage.

6. A leveling valve assembly comprising a casing having a main cavity, a first, second, and third chamber, an intake passage connecting the first chamber with said main cavity, an alternate intake passage connecting said second chamber with said cavity, an exhaust passage connecting said third chamber with said cavity, closure valves mounted in said cavity movable to open and close said intake passage and said exhaust passage, a passage connecting said first and second chamber, a passage connecting said second and third chamber, a closure in said second chamber normally closing said alternate intake passage, and fluid pressure responsive means associated with said last mentioned closure adapted to open said alternate intake passage upon increase of fluid pressure in said second chamber above a predetermined level.

7. A leveling valve assembly comprising a casing having a main cavity, a first, second, and third chamber, an intake passage connecting the first chamber with said main cavity, an alternate intake passage connecting said second chamber with said cavity, an exhaust passage connecting said third chamber with said cavity, closure valves mounted in said cavity movable to open and close said intake passage and said exhaust passage, a passage connecting said first and second chamber, a passage connecting said second and third chamber, a closure in said second chamber spring biased to a position normally closing said alternate intake passage, and a diaphragm element associated with said last mentioned closure adapted to displace said closure to open said alternate intake passage upon increase of fluid pressure in said second chamber above a predetermined level.

8. A leveling valve assembly comprising a casing having a main cavity, a first, second, and third chamber, an intake passage connecting the first chamber with said main cavity, an alternate intake passage connecting the second chamber with said cavity, an exhaust passage connecting the third chamber with said cavity, closure valves mounted in said cavity movable to open and close said intake passage and said exhaust passage, a passage connecting said first and second chamber, a passage connecting said second and third chamber, a closure in said second chamber, spring means urging said closure to a position closing said alternate intake passage, a diaphragm element partitioning said second chamber, means connecting said closure to said diaphragm whereby increase of fluid pressure in said second chamber above a predetermined level acting on said diaphragm moves said closure to a position opening said alternate intake passage.

9. A leveling valve assembly comprising a casing having a main cavity, a first, second, and third chamber, an intake passage connecting the first chamber with said main cavity, an alternate intake passage connecting the second chamber with said cavity, an exhaust passage connecting the third chamber with said cavity, flap valves mounted in said cavity movable to open and close said intake passage and said exhaust passage, a passage connecting said first and second chamber, a passage connecting said second and third chamber, a closure in said second chamber normally closing said alternate intake passage, and fluid pressure responsive means associated with said last mentioned closure adapted to open said alternate intake passage and close said passage connecting said second and third chamber upon increase of fluid pressure in said second chamber above a predetermined level.

10. A leveling valve assembly comprising a casing having a main cavity, a first, second, and third chamber, an intake passage connecting the first chamber with said main cavity, an alternate intake passage connecting the second chamber with said cavity, an exhaust passage connecting the third chamber with said cavity, lever operated flap valves mounted in said cavity movable to open and close said intake passage and said exhaust passage, a passage connecting said first and second chamber, a passage connecting said second and third chamber, a closure in said second chamber disposed between said alternate intake passage and said passage connecting said second and third chamber normally closing said alternate intake passage, and fluid pressure responsive means associated with said last mentioned closure adapted to open said alternate intake passage and close said passage connecting said second and third chamber upon increase of fluid pressure in said second chamber above a predetermined level.

11. The structure set forth in claim 10 wherein said pressure responsive means comprises a diaphragm element partitioning said second chamber.

12. An air suspension system for vehicles comprising, an air spring disposed between the sprung and unsprung mass of the vehicle, an air intake circuit selectively adjustable to two different levels of pressure, air intake and exhaust valve means actuatable to open position responsive to variation in displacement between the sprung and unsprung mass of the vehicle, and additional intake valve means independent of said first mentioned intake valve means actuated to open position by increase in air intake circuit pressure to the higher of said two different levels of pressure.

References Cited in the file of this patent
UNITED STATES PATENTS

| | | |
|---|---|---|
| 820,707 | Downer | May 15, 1906 |
| 2,844,386 | Pribonic | July 22, 1958 |